United States Patent Office 3,318,939
Patented May 9, 1967

3,318,939
N-ALIPHATIC S-(2-CYANOALLYL) DITHIO-CARBAMATES
Harry G. Durham and George R. Haynes, Modesto, Calif., assignors to Shell Oil Company, New York, N.Y., a corporation of Delaware
No Drawing. Filed Nov. 2, 1964, Ser. No. 408,396
10 Claims. (Cl. 260—455)

This invention relates to novel aliphatic dithiocarbamates. In particular the invention is concerned with a novel class of aliphatic dithiocarbamates characterized by a 2-cyanoallyl moiety bonded to the sulfur atom. These novel compounds have been found useful in the prevention and treatment of disease caused by microorganisms. These compounds are of special interest as soil fungicides to control soil-borne diseases of plants. These compounds further have application as disinfectants, bacteriostats, fungistats, and utility as foliage fungicides.

Many of the organisms which form part of the disease complex that inhabit the soil subsist on living plants. Many injure the roots and other underground portions, others attack the crown of the plant, while still others are capable of damaging the stem and other above-ground portions of the plant. When plants are grown year after year in the same soil, the injury by soil pathogens is most likely to become more serious the longer the land is in cultivation, because the ready food supply leads to building of the pathogens.

Attempts have been made to control soil fungi by suitable crop rotation, by the elimination of weeds which serve as hosts for the disease organisms, and by the propagation of resistant varieties of crops. These, and other cultural practices, have tended to reduce the damage of soil pathogens but have not fully met the present needs of intensive agriculture. The use of chemicals has met with considerable measure of success and has been confined to high value crops. The major chemicals of importance for field application to soil have been the more volatile substances which penetrate well into the soil spaces, exert their toxic action as a vapor, then volatilize from the soil prior to planting of the crop. These compounds are generally applied to the soil in high gallonage and are relatively expensive. Furthermore, there is the danger that if the chemical has not left the soil, it may be phytotoxic to the crop.

These now has been discovered a new class of chemicals which are remarkably effective as soil fungicides but are not phytotoxic at the fungicidally effective dosages. These are fungitoxic to a broad spectrum of noxious soil fungi and can be used with safety with respect to injury of the crop to be protected. These chemicals because of their low effective concentrations will provide fungus control at much lower dosage levels then the conventional volatile materials. This should permit chemical control of soil fungi for crops for which heretofore no effectively economic control has been possible.

The compounds of this invention have been found effective on many of the more important genera of fungi which cause rot and damping-off of plants. These include species of *Pythium, Verticillium, Phytophthora, Rhizoctonia, Fusarium,* and *Thielaviopsis.*

In addition the compounds of this invention are effective in controlling the growth of a number of pathogenic organisms of importance to man and domestic animals such as certain gram negative and acid-fast bacteria.

The N-aliphatic S-(2-cyanoallyl) dithiocarbamates of this invention may be represented by the formula:

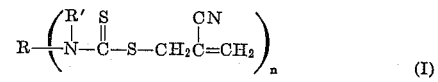

wherein $n=1$ or 2, with the proviso that when $n=1$, R is a monovalent group containing from 1 to 5 carbon atoms of the class consisting of alkyl, alkoxy, alkoxyalkyl, alkylthioalkyl, (middle halo)alkyl, hydroxyalkyl, aminoalkyl, and monoalkylaminoalkyl, or dialkylaminoalkyl group of from 2 to 10 carbon atoms, and when $n=2$, R is alkylene of 2 to 5 carbon atoms in which the carbon chain can be interrupted by one oxygen, sulfur, or nitrogen atom, R' represents hydrogen, alkyl of 1 to 5 carbon atoms, alkenyl of 2 to 5 carbon atoms, (middle halo)alkyl of 1 to 5 carbon atoms, (middle halo)alkenyl of 2–5 carbon atoms, and alkoxy of 1–5 carbon atoms.

A preferred, fungicidally active, class have the formula:

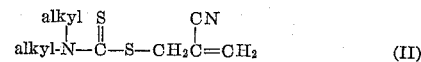

wherein each alkyl contains from 1 to 5 carbon atoms. Examples of such compounds are 2-cyanoallyl dimethyldithiocarbamate, 2-cyanoallyl diethyldithiocarbamate and the like.

A further preferred class of active fungicides are represented by the formula:

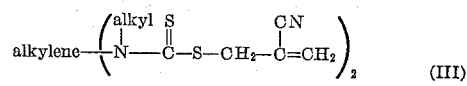

wherein the alkylene contains from 2 to 6 carbon atoms, and the alkyl contains 1 to 5 carbon atoms. An example of such a compound is bis(2-cyanoallyl)ethylenebis(methyldithiocarbamate).

Also preferred are the active dithiocarbamates of the formula:

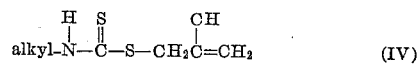

wherein the alkyl contains from 1 to 5 carbon atoms. Active fungicides of this group are exemplified by 2-cyanoallyl methyldithiocarbamate.

Still another preferred subclass of active fungicides are those compounds represented by the formula:

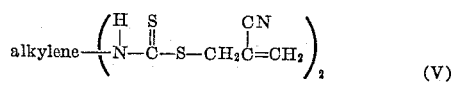

wherein the alkylene contains from 2 to 6 carbon atoms. Typical of the active fungicides of this group is bis (2-cyanollyl)ethylenebis(dithiocarbamate).

Especially preferred because of their physical properties and outstanding effectiveness as soil fungicides are those compounds of Formulae II and IV where the alkyl group is methyl.

Representative N-aliphatic S-cyanoallyl dithiocarbamates include, for example:

Bis(2-cyanoallyl) ethylenebis(cyanodithiocarbamate)
Bis(2-cyanoallyl) ethylenebis(aminodithiocarbamate)
Bis(2-cyanoallyl) ethylenebis(methylaminodithiocarbamate)

Bis(2-cyanoallyl) ethylenebis(ethylaminodithiocarbamate)
Bis(2-cyanoallyl) ethylenebis(butylaminodithiocarbamate)
Bis(2-cyanoallyl) ethylenebis(dimethylaminodithiocarbamate)
Bis(2-cyanoallyl) ethylenebis(diisopropylaminodithiocarbamate)
Bis(2-cyanoallyl) ethylenebis(hydroxydithiocarbamate)
Bis(2-cyanoallyl) ethylenebis(trichloromethyl dithiocarbamate)
Bis(2-cyanoallyl) ethylenebis(ethoxydithiocarbamate)
Bis(2-cyanoallyl) ethylenebis(ethyldithiocarbamate)
Bis(2-cyanoallyl) ethylenebis(pentyldithiocarbamate)
2-cyanoallyl dipropyldithiocarbamate
2-cyanoallyl dibutyldithiocarbamate
2-cyanoallyl propyldithiocarbamate
2-cyanoallyl pentyldithiocarbamate
2-cyanoallyl (amino)methyldithiocarbamate
2-cyanoallyl (methylamino)methyldithiocarbamate
2-cyanoallyl (ethylamino)methyldithiocarbamate
2-cyanoallyl (diethylamino)methyldithiocarbamate
2-cyanoallyl (hydroxy)methyldithiocarbamate
2-cyanoallyl (trichloromethyl)methyldithiocarbamate
2-cyanoallyl (ethoxy)methyldithiocarbamate
2-cyanoallyl (methyl)vinyldithiocarbamate
2-cyanoallyl methyltrichlorovinyldithiocarbamate and the like.

Briefly, the novel aliphatic S-2-cyanoallyl dithiocarbamates of the invention can be prepared by reacting 2-cyanoallyl chloride with a dithiocarbamate salt according to the following equation:

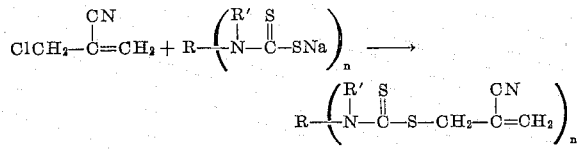

where R, R' and n are as hereinbefore defined.

The following examples are presented to illustrate how certain aliphatic S-2-cyanoallyl dithiocarbamates of the invention may be prepared and to demonstrate their utility as soil fungicides. These examples should not be regarded as limiting the scope of the invention.

EXAMPLE I

*Preparation of 2-cyanoallyl dimethyldithiocarbamate*

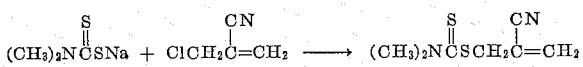

To 132 parts of 2-cyanoallyl chloride in 800 parts of benzene at 10–20° C. there was added 185.9 parts of sodium dimethyldithiocarbamate. The mixture was stirred for three hours, filtered, and the filtrate was evaporated to yield 226 parts (94% yield) of crystalline solid; M.P. 36–8°. The identity was confirmed by elemental analysis, percent by weight:

Calculated: N, 15.1; S, 34.4. Found: N, 15.1; S, 34.0.

EXAMPLE II

*Preparation of 2-cyanoallyl diethyldithiocarbamate*

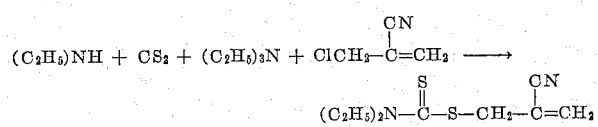

29.2 parts of diethylamine were slowly added to 200 parts of a benzene solution containing 30.4 parts of carbon disulfide and 40.4 parts of triethylamine. The resulting orange solution was added at 0° C. to 100 parts of a benzene solution containing 40.7 parts of 2-cyanoallyl chloride. The reaction mixture was allowed to rise to 25° for 30 minutes then water was added to the benzene layer which was filtered and molecularly distilled to yield 54 parts of the desired product (63% yield), the identity of which was confirmed by elemental analysis, percent by weight:

Calculated: N, 13.1; S, 29.9. Found: N, 13.4; S, 29.5.

EXAMPLE III

*Preparation of 2-cyanoallyl methyldithiocarbamate*

To 39.6 parts of 2-cyanoallyl chloride in 200 parts of acetonitrile at 10–20° C. there was added 50.3 parts of sodium methyldithiocarbamate. The reaction mixture was stirred for three hours, filtered, and the filtrate was evaporated to yield 63 parts (94% yield) of chystalline solid; M.P. 44–5°. The identity was confirmed by elemental analysis, percent by weight:

Calculated: N, 15.3; S, 37.2. Found: N, 15.6; S, 36.4.

EXAMPLE IV

*Bis(2-cyanoallyl)ethylenebis(dithiocarbamate)*

$$(-CH_2NH\overset{S}{\overset{\|}{C}}SNa)_2 + 2ClCH_2\overset{CN}{\overset{|}{C}}=CH_2 \longrightarrow$$

$$(-CH_2NH\overset{S}{\overset{\|}{C}}SCH_2\overset{CN}{\overset{|}{C}}=CH_2)_2$$

68 parts of the bis soduim hexahydrate salt of ethylenebis(dithiocarbamic acid) was slowly added to 40.6 parts of 2-cyanoallyl chloride in 200 parts of acetonitrile. The mixture was kept cool during the addition and then stirred at room temperature for 40 hours. After stirring, filtration, and concentarting the filtrate, the residue was recrystalized; M.P. 118–121°. The structure was confirmed by infrared and elemental analysis, viz (percent by weight):

Calculated: N, 16.4; S, 37.4. Found: N, 16.4; S, 37.0.

EXAMPLE V

*Bis(2-cyanoallyl)ethylenebis(methyldithiocarbamate)*

Using a procedure similar to that of example IV, bis (2-cyanoallyl)ethylenebis(methyldithiocarbamate), M. P. 100–102°, was prepared by the addition of the bis sodium hexahydrate salt of ethylenebis(methyldithiocarbamic acid) and 2-cyanoallyl chloride, according to the following equation:

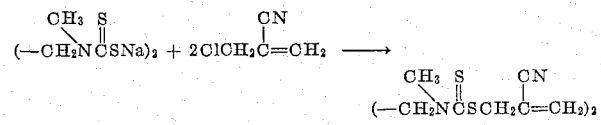

EXAMPLE VI

*S-cyanoallyl dithiocarbamates as soil fungicides*

The compounds were evaluated by impregnating the compound on clay granules then blending the granules with soil naturally infected with root rotting organisms. The treated soil was then transferred into small plant pots. Indicator plants were next planted in the treated soil. Observations were made in three weeks on the germination and vigor of the plants. The roots were washed free of soil and indexed for disease.

The diseases and crops on which observations were made were: *Rhizoctonia solani* on tomato, *Fusarium sp.* on cotton, *Thielaviopsis basicola* on pinto beans, and *Pythium ultimum* on sugar beets. Estimates of disease control were expressed on an A-B-C-D- basis; A being 75–100% disease control, B being 50–75% disease control, C being 25–50% disease control and D being 0–25% disease control.

The data on several representative S-cyanoallyl dithiocarbamates of the invention are presented in Table I. At the dosages indicated none of the compounds was appreciably phytotoxic to the indicator plants.

Spraying of the plants to be treated may be performed with aqueous emulsions, solutions, or suspensions of the active agents. The spray liquid is generally applied at a rate of from about 75 to 150 gallons per acre. If spray-

TABLE I.—TOXICITY OF S-CYANOALLYL DITHIOCARBAMATES TO SOIL ORGANISMS

| Compound | P.p.m. in Soil | Fungitoxic Rating | | | |
|---|---|---|---|---|---|
| | | Thielaviopsis | Fusarium | Rhizoctonia | Pythium |
| 2-cyanoallyl diethyldithiocarbamate. | 25 | | C | | A. |
| 2-cyanoallyl dimethyldithiocarbamate. | 25 | AB | C | A | A. |
| | 12 | | C | A | A. |
| Bis(2-cyanoallyl)ethylenebis (methyldithiocarbamate). | 200 | | | BC | A. |

Bis(2 - cyanoallyl)ethylenebis(dithiocarbamate) also has been found active as a soil fungicide.

EXAMPLE VII

*Effectiveness of S-2-cyanoallyl dithiocarbamates on foliage fungi*

The leaves of greenhouse grown cucumber, tomato, bean, potato, wheat, and apple seedlings are sprayed on both the under and upper surfaces with a twin nozzle sprayer. During spraying, the plants are placed on a turntable so as to get an even distribution of the spray over the plant. The test chemicals are diluted from acetone concentrate solutions to give the desired dilution in parts per million.

Following spraying, the plants are allowed to dry. The sprayed plants are then inoculated with the following organisms: potato, *Phytopthora infestans;* wheat, *Puccinia recondita;* apple, *Venturia inaqualis;* tomato, *Alternaria solani;* bean, *Colletotrichum lindemuthianum* and *Uromyces phaseoli;* cucumber, *Erysiphe cichoracearum*. All inoculated plants except cucumber are immediately placed at 100% R.H. and 72° F. for 24 hours. Cucumber plants are placed directly in the greenhouse. The other plants are then removed to a greenhouse at 80% relative humidity and 70° F. Symptoms develop on all plants but apple in 7 days. Apples require about 21 days for symptoms to develop.

ing is effected with smaller quantities of liquid as in low-volume spraying, high concentrations of the active agents should be employed. If desired, a minor amount of the order of about 0.001 to about 0.5% by weight of a wetting agent may be added to aid in forming a suspension in the aqueous medium. Any of the conventional wetting agents can be employed. Particularly suitable wetting agents are the sodium salts of a mixture of secondary heptadecyl sulfate, sold commercially under the names of "Teepol" and polyethylene glycol ethers of alkyl phenols sold under the trade names of "Triton X–100" and "Triton X–155." Preferably concentrated compositions comprising an active compound of the present invention and a suitable wetting agent are prepared, and the concentrate is then dispersed in water prior to use.

A further form in which the fungicidal compounds of the present invention may be applied for horticultural use consists of solutions of the active ingredient in suitable inert liquid or semi-solid diluents in which the active ingredient is present in molecularly dispersed form. The form in which the agents to be employed are applied to the objects treated depends on the nature of the object and the purpose of the application. Suitable inert solvents for the manufacture of liquid prepartions should not be readily flammable, as odorless as possible and without any toxic effect on humans and animals when properly used. Neither should they have a corrosive

TABLE II. DISEASE CONTROL END POINT OF SOME S-2-CYANOALLYL DITHIOCARBAMATES

| Compound | End-point in p.p.m. on Following Organisms [1] | | | | | | |
|---|---|---|---|---|---|---|---|
| | P.i. | P.r. | U.p. | A.s. | C.l. | E.c. | V.i. |
| 2-cyanoallyl methyldithiobarbamate | 250–500 | | 125 | 500–1,000 | 250–500 | | |
| 2-cyanoallyl diethyldithiocarbamate | | 500 | | 500 | 250 | | |
| Bis(2-cyanoallyl) ethylenebis (dithiocarbamate) | 32 | 32–64 | 64 | 250 | 64 | | <64 |
| Bis(2-cyanoallyl) ethylenebis (methyldithiocarbamate) | | 64 | 64 | | 1,000 | 1,000 | |

[1] P.i.=*Phytophthora infestans;* P.r.=*Puccinia recondita;* U.p.=*Uromyces phaseoli;* A.s.=*Alternaria solani;* C.l.=*Colletotrichum lindemuthianum;* E.c.=*Erysiphe cichoracearum;* V.i.=*Venturia inaequalis.*

For horticultural purposes, the active compounds of the present invention may be used alone or in combination with other fungicidal, viricidal, insecticidal or acaricidal materials, the action on which may be either internal or external, with plant nutritives, plant hormones, and the like. Wetting agents and, if necessary or desirable, stickers such as the heavy hydrocarbon oils with a minimum viscosity of 10° Engler at 50° C. can be present. The wetting agent must be non-reactive with the compounds of the present invention. Non-ionic surfactants seem preferable. If the toxic agents are employed in the form of emulsions or suspensions, for example, in water, solvents such as oils, emulsifiers, emulsion stabilizers, and the like may be added. Materials which suppress phytotoxic action may also be added if desired. For example, glucose is known to protect tomato plants against damage by certain substances having a phytotoxic effect when employed in concentrated form. The compounds of the present invention may be applied by means of spraying.

effect on the components of the preparations or the material of the storage vessel. Examples of suitable solvents are high-boiling oils, e.g., oils of vegetable origin, such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

For horticultural use the active compounds of the present invention may also be applied in the form of dusts, utilizing as the inert vehicle such materials as tricalcium phosphate, precipitated chalk, bentonite, kaolin, kieselguhr, etc. These compounds may also be employed in the form of aerosols. For this purpose the active ingredient is dissolved or dispersed in a solvent boiling below room temperature at atmospheric pressure.

In horticultural compositions the content of the active fungicidal component may vary from 0.1% to as much as 75% or more, depending upon the type of formulation employed.

For field application, the rate of application of the active agent may be varied from about 0.5 to 30 or more pounds per acre. It will be appreciated that the rate of application is subject to variation according to the particular active compound according to the invention used, the particular species or complex of organisms to be controlled, the species of plants to be protected, and local conditions, for example, temperature humidity, moisture content of the soil, nature of the soil and the like. Effective resolution of these factors is well within the skill of those well versed in the pesticide art.

The fungicidal compositions may contain one or more of the soil fungicidal cyanoallyl dithiocarbamates set out hereinbefore as the sole active agent, or they may contain in addition thereto other biologically active substances. Thus, for example other fungicides known to the art may be used in conjunction with the compounds of the invention. Insecticides such as, for example, DDT, aldrin, dieldrin, endrin, chlordane, methoxychlor, DDVP, naled, Phosdrin® Insecticide, Bidrin® Insecticide, and the like may be incorporated into marketable formulations. Further, if desired, the fungicidal compositions may contain nematocides, fertilizers, trace elements, and the like.

We claim as our invention:

1. N-aliphatic S-(2-cyanoallyl) dithiocarbamates of the formula:

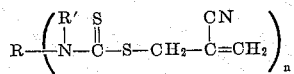

wherein $n=1-2$, with the proviso that when $n=1$, R is a member of the group consisting of alkyl of 1 to 5 carbon atoms, alkoxy of 1 to 5 carbon atoms, alkoxyalkyl of 1 to 5 carbon atoms, alkylthioalkyl of 1 to 5 carbon atoms, (middle halo)alkyl of 1 to 5 carbon atoms, hydroxyalkyl of 1 to 5 carbon atoms, aminoalkyl of 1 to 5 carbon atoms, monoalkylaminoalkyl of 1 to 5 carbon atoms and dialkylaminoalkyl of 2 to 10 carbon atoms and when $n=2$, R is a member of the groups consisting of alkylene of 2 to 5 carbon atoms and such alkylene interrupted by one of sulfur, oxygen, and nitrogen; R' is a member of the group consisting of hydrogen, alkyl of 1 to 5 carbon atoms, alkenyl of 2 to 5 carbon atoms, (middle halo)alkyl of 1 to 5 carbon atoms, (middle halo)alkenyl of 2 to 5 carbon atoms, and alkoxy of 1 to 5 carbon atoms.

2. N-aliphatic S-(2-cyanoallyl) dithiocarbamates of the formula:

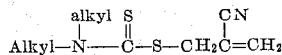

wherein each alkyl contains from 1 to 5 carbon atoms.

3. N-aliphatic S-(2-cyanoallyl) dithiocarbamates of the formula:

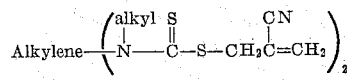

wherein the alkylene contains from 2 to 5 carbon atoms, and the alkyl contains from 1 to 5 carbon atoms.

4. N-aliphatic S-(2-cyanoallyl) dithiocarbamates of the formula:

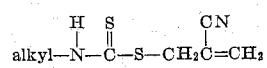

wherein the alkyl contains from 1 to 5 carbon atoms.

5. N-aliphatic S-(2-cyanoallyl) dithiocarbamates of the formula:

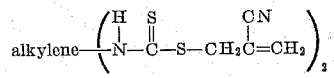

wherein the alkylene contains from 2 to 6 carbon atoms.

6. 2-cyanoallyl dimethyldithiocarbamate.
7. 2-cyanoallyl diethyldithiocarbamate.
8. 2-cyanoallyl methyldithiocarbamate.
9. bis(2-cyanoallyl)ethylenebis(methyldithiocarbamate).
10. bis(2-cyanoallyl)ethylenebis(dithiocarbamate).

No references cited.

CHARLES B. PARKER, *Primary Examiner.*
BERNARD BILLIAN, *Assistant Examiner.*